(12) United States Patent
Galeev

(10) Patent No.: US 9,588,546 B2
(45) Date of Patent: Mar. 7, 2017

(54) WIRELESS ELECTRONIC DEVICES WITH A METAL PERIMETER INCLUDING A PLANAR USER INPUT COMPONENT

(71) Applicant: Sony Mobile Communications AB, Lund (SE)

(72) Inventor: Roustem Galeev, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 432 days.

(21) Appl. No.: 13/661,125

(22) Filed: Oct. 26, 2012

(65) Prior Publication Data

US 2014/0120979 A1    May 1, 2014

(51) Int. Cl.
| | |
|---|---|
| *H04W 24/00* | (2009.01) |
| *G06F 1/16* | (2006.01) |
| *H01Q 1/24* | (2006.01) |
| *H01Q 1/52* | (2006.01) |
| *H04M 1/02* | (2006.01) |
| *H04M 1/23* | (2006.01) |

(52) U.S. Cl.
CPC .......... *G06F 1/1626* (2013.01); *G06F 1/1698* (2013.01); *H01Q 1/243* (2013.01); *H01Q 1/521* (2013.01); *H04M 1/0202* (2013.01); *H04M 1/026* (2013.01); *H04M 1/0264* (2013.01); *H04M 1/236* (2013.01)

(58) Field of Classification Search
CPC ..... H04M 1/0214; H04Q 1/243; H04Q 1/242; H04B 1/3833; H04B 1/3888
USPC .............. 455/575.1, 575.5, 575.7, 575.8
See application file for complete search history.

(56) References Cited

U.S. PATENT DOCUMENTS

| 8,442,593 | B1 * | 5/2013 | Kwon | H04M 1/0266 |
|---|---|---|---|---|
| | | | | 455/556.1 |
| 2008/0094357 | A1 * | 4/2008 | Kalantri | 345/158 |
| 2011/0187622 | A1 * | 8/2011 | Yukimoto et al. | 343/848 |
| 2011/0255259 | A1 * | 10/2011 | Weber et al. | 361/807 |
| 2012/0157175 | A1 * | 6/2012 | Golko et al. | 455/575.7 |
| 2012/0238331 | A1 * | 9/2012 | Dou et al. | 455/574 |
| 2013/0035103 | A1 * | 2/2013 | Mujtaba et al. | 455/450 |

OTHER PUBLICATIONS

Extended European Search Report Corresponding to European Application No. 13196332.4; Dated: Mar. 3, 2014; 7 Pages.
Chinese Office Action Corresponding to Chinese Patent Application No. 201310439114.1; Date Mailed: Apr. 23, 2015; Foreign Text, 6 Pages, English Translation Thereof, 10 Pages.
Chinese Office Action Corresponding to Chinese Patent Application No. 201310439114.1; Date Mailed: Apr. 13, 2016; Foreign Text, 4 Pages, English Translation Thereof, 5 Pages.
Chinese Office Action Corresponding to Chinese Patent Application No. 201310439114.1; Date Mailed: Nov. 4, 2015; Foreign Text, 8 Pages, English Translation Thereof, 10 Pages.

* cited by examiner

*Primary Examiner* — Shantell L Heiber
(74) *Attorney, Agent, or Firm* — Myers Bigel, P.A.

(57) ABSTRACT

Wireless electronic devices may include a ground plane and a metal perimeter around the ground plane. The metal perimeter may include a planar user input component including an outer surface that is substantially coplanar with an outer surface of an adjacent portion of the metal perimeter.

14 Claims, 5 Drawing Sheets

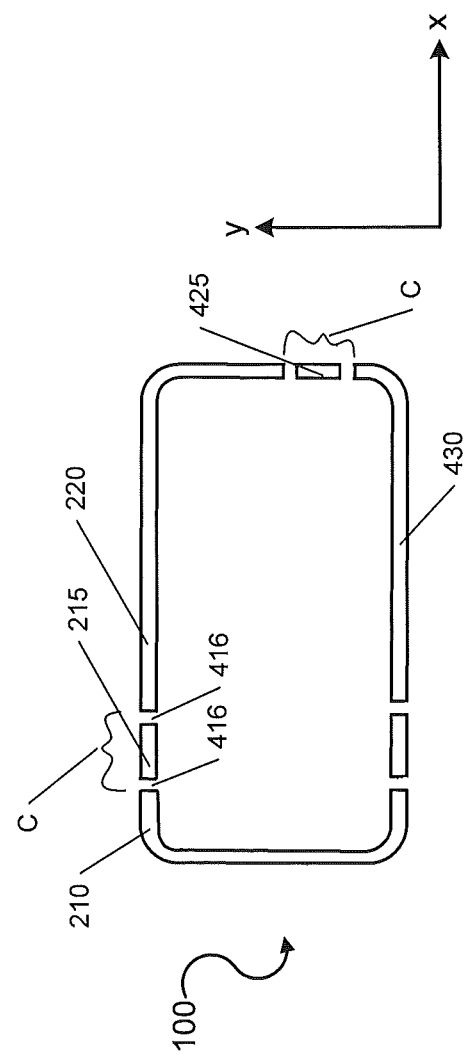

WIRELESS ELECTRONIC DEVICES WITH A METAL PERIMETER INCLUDING A PLANAR USER INPUT COMPONENT

FIELD

The present inventive concepts generally relate to the field of communications and, more particularly, to antennas and wireless electronic devices incorporating the same.

BACKGROUND

Wireless electronic devices may include insulators between nearby antennas to reduce antenna interference. Such insulators may be visually exposed to users of the wireless electronic devices and may therefore provide a discontinuous look to the exterior of the wireless electronic devices. The insulators may also be relatively narrow, which may make the antennas susceptible to short-circuits caused by a user's hand.

SUMMARY

Various embodiments of the present inventive concepts include wireless electronic devices. The wireless electronic devices may include a ground plane and a metal perimeter around the ground plane. The metal perimeter may include a planar user input component including an outer surface that is substantially coplanar with an outer surface of an adjacent portion of the metal perimeter.

In various embodiments, the metal perimeter may include first and second antennas separated by the planar user input component.

According to various embodiments, the outer surface of the adjacent portion of metal perimeter may include at least a portion of one of the first and second antennas.

In various embodiments, the planar user input component may include a camera user input component (e.g., to receive a user input to control camera functions), a volume user input component (e.g., to receive a user input to control speaker/ringer functions), or a power user input component (e.g., to receive a user input to control power functions).

According to various embodiments, the planar user input component may include a mechanically-immobile sensor.

In various embodiments, the mechanically-immobile sensor may include a touch sensor.

According to various embodiments, the first and second antennas and the outer surface of the planar user input component may include the same metal.

In various embodiments, the planar user input component may be a first planar user input component, and the metal perimeter may include a second planar user input component. An outer surface of the second planar user input component may be coplanar with an outer surface of an adjacent portion of the metal perimeter.

According to various embodiments, the wireless electronic devices may include a processor, a camera, and a speaker. The first planar user input component may be configured to provide a first user input signal to the processor to control a volume function (e.g., volume level, mute/unmute, vibrate, etc.) of the speaker. The second planar user input component may be configured to provide a second user input signal to the processor to control the camera.

In various embodiments, the wireless electronic devices may include a multi-band transceiver circuit coupled to the first and second antennas and configured to provide communications for one of the wireless electronic devices via a plurality of frequency bands.

According to various embodiments, the metal perimeter may include a third antenna. At least one of the first and second antennas may include a cellular antenna. The third antenna may include a non-cellular antenna or a diversity antenna.

In various embodiments, the first and second antennas may include respective cellular antennas.

According to various embodiments, the wireless electronic devices may include a metal backplate on the multi-band transceiver circuit.

In various embodiments, the wireless electronic devices may include an audio/video connector and a power connector. The planar user input component may be one planar user input component among a plurality of planar user input components along/in the metal perimeter. The first and second antennas may be first and second antennas among a plurality of antennas along/in the metal perimeter. The metal perimeter may include a continuous metal perimeter except for respective cuts/discontinuities in the metal perimeter corresponding to the audio/video connector, the power connector, and the plurality of planar user input components.

According to various embodiments, each of the cuts/discontinuities in the metal perimeter may include an opening including an insulator and a respective one of the audio/video connector, the power connector, or one of the plurality of planar user input components. In some embodiments, the metal perimeter may include a cut/discontinuity corresponding to a strap holder.

Wireless electronic devices according to various embodiments may include a multi-band transceiver circuit configured to provide communications for one of the wireless electronic devices via a plurality of frequency bands. The wireless electronic devices may include a metal perimeter around the multi-band transceiver circuit. The metal perimeter may include a plurality of antennas and a planar user input component including an outer surface that is coplanar with an outer surface of an adjacent portion of the metal perimeter.

In various embodiments, the planar user input component may be one planar user input component among a plurality of planar user input components along/in the metal perimeter. The metal perimeter may include a plurality of connector components. The plurality of planar user input components and the plurality of connector components may correspond to respective cuts/discontinuities in the metal perimeter. The metal perimeter may be a continuous metal perimeter except for the cuts/discontinuities.

According to various embodiments, the plurality of connector components may include one or more audio/video connectors, one or more power connectors, and/or one or more physical attachment connectors.

In various embodiments, the planar user input component may include a mechanically-immobile sensor configured to receive a user input from a user of one of the wireless electronic devices.

According to various embodiments, the wireless electronic devices may include a processor, a camera, a speaker, and a display screen. The planar user input component may be configured to provide a user input signal to the processor to power on/off the display screen, to control a volume function of the speaker, or to control the camera, responsive to the user input.

Other devices and/or systems according to embodiments of the inventive concepts will be or become apparent to one with skill in the art upon review of the following drawings and detailed description. It is intended that all such additional devices and/or systems be included within this description, be within the scope of the present inventive concepts, and be protected by the accompanying claims. Moreover, it is intended that all embodiments disclosed herein can be implemented separately or combined in any way and/or combination.

BRIEF DESCRIPTION OF THE DRAWINGS

FIG. 5 illustrates coplanar elements of a metal perimeter of a wireless electronic device, according to various embodiments of the present inventive concepts.

DETAILED DESCRIPTION OF EMBODIMENTS

Figure 1:
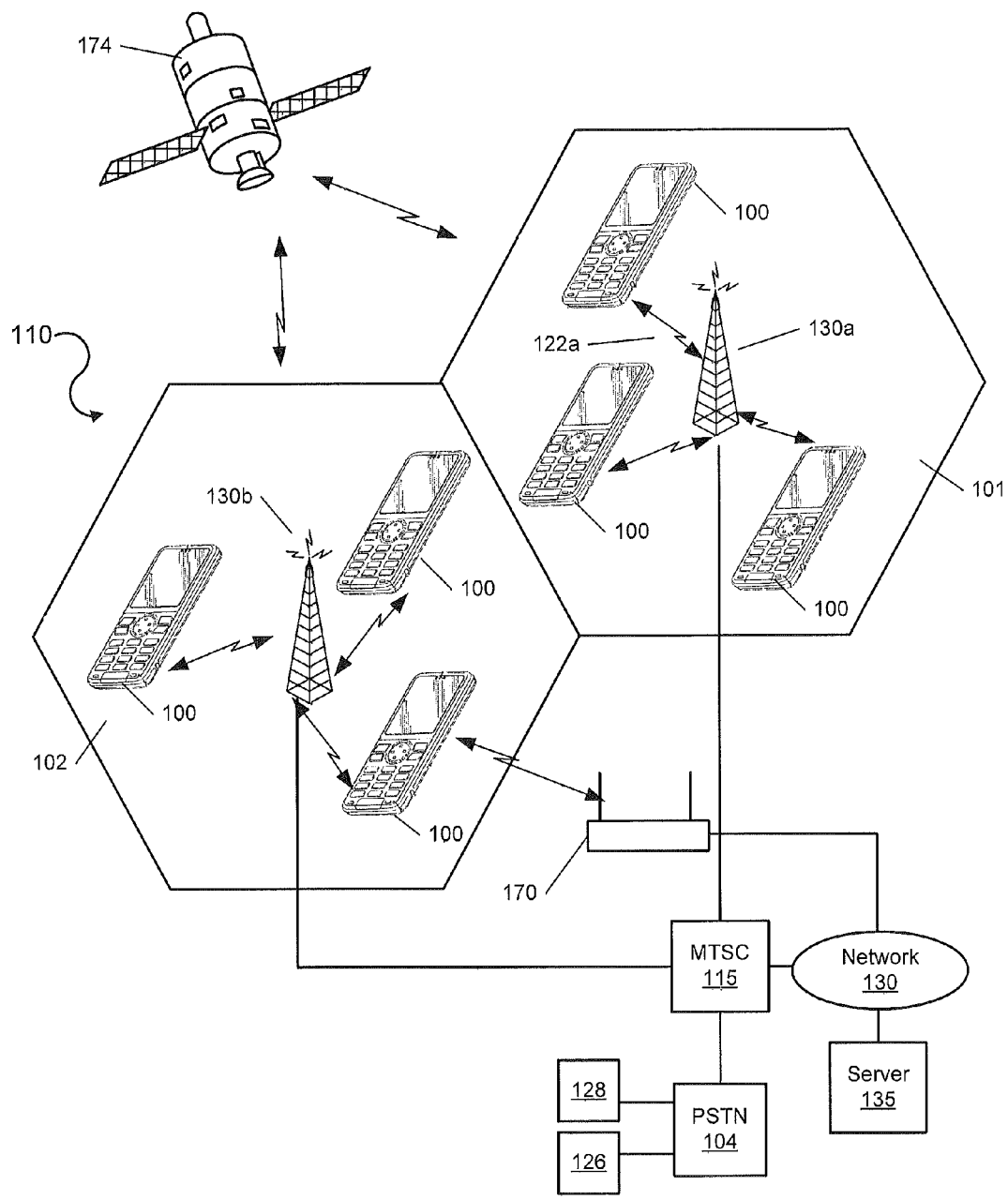
FIG. 1 is a schematic illustration of a wireless communications network that provides service to wireless electronic devices, according to various embodiments of the present inventive concepts.

The present inventive concepts now will be described more fully with reference to the accompanying drawings, in which embodiments of the inventive concepts are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein the term "and/or" includes any and all combinations of one or more of the associated listed items.

Spatially relative terms, such as "above," "below," "upper," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of illustration and explanation only, various embodiments of the present inventive concepts are described herein in the context of "wireless electronic devices." Among other devices/systems, wireless electronic devices may include multi-band wireless communication terminals (e.g., portable electronic devices/wireless terminals/mobile terminals/terminals) that are configured to carry out cellular communications (e.g., cellular voice and/or data communications) in more than one frequency band. It will be understood, however, that the present inventive concepts are not limited to such embodiments and may be embodied generally in any device and/or system that is configured to transmit and receive in one or more frequency bands.

Exposed insulators along an exterior of a conventional wireless electronic device may provide a discontinuous look and may be too narrow to prevent short-circuits between nearby antennas. Moreover, conventional user input components such as conventional power, volume, and/or a camera buttons may protrude from the exterior of the wireless electronic device, which may exacerbate the discontinuous look of the exterior. Various embodiments of the wireless electronic devices described herein, however, may include a metal perimeter that includes a plurality of antennas and a planar user input component. The planar user input component described herein may have a metal surface that is exposed to users of the wireless electronic device, and may provide the functionality of a power, volume, or camera button. Accordingly, the metal planar user input component, which is several times wider than most conventional exposed insulators, may reduce short-circuits between nearby antennas and may provide a smoother, more continuous look to the exterior of a wireless electronic device.

Referring to FIG. 1, a diagram is provided of a wireless communications network 110 that supports communications in which wireless electronic devices 100 can be used according to various embodiments of the present inventive concepts. The network 110 includes cells 101, 102 and base stations 130a, 130b in the respective cells 101, 102. Networks 110 are commonly employed to provide voice and data communications to subscribers using various radio access standards/technologies. The network 110 may include wireless electronic devices 100 that may communicate with the base stations 130a, 130b. The wireless electronic devices 100 in the network 110 may also communicate with a Global Positioning System (GPS) satellite 174, a local wireless network 170, a Mobile Telephone Switching Center (MTSC) 115, and/or a Public Service Telephone Network (PSTN) 104 (i.e., a "landline" network).

The wireless electronic devices 100 can communicate with each other via the Mobile Telephone Switching Center (MTSC) 115. The wireless electronic devices 100 can also communicate with other devices/terminals, such as terminals 126, 128, via the PSTN 104 that is coupled to the network 110. As also shown in FIG. 1, the MTSC 115 is coupled to a computer server 135 via a network 130, such as the Internet.

The network 110 is organized as cells 101, 102 that collectively can provide service to a broader geographic region. In particular, each of the cells 101, 102 can provide service to associated sub-regions (e.g., regions within the hexagonal areas illustrated by the cells 101, 102 in FIG. 1) included in the broader geographic region covered by the network 110. More or fewer cells can be included in the network 110, and the coverage area for the cells 101, 102 may overlap. The shape of the coverage area for each of the cells 101, 102 may be different from one cell to another and is not limited to the hexagonal shapes illustrated in FIG. 1. Each of the cells 101, 102 may include an associated base station 130a, 130b. The base stations 130a, 130b can provide wireless communications between each other and the wireless electronic devices 100 in the associated geographic region covered by the network 110.

Each of the base stations 130a, 130b can transmit/receive data to/from the wireless electronic devices 100 over an associated control channel. For example, the base station 130a in cell 101 can communicate with one of the wireless electronic devices 100 in cell 101 over the control channel 122a. The control channel 122a can be used, for example, to page the wireless electronic device 100 in response to calls directed thereto or to transmit traffic channel assignments to the wireless electronic device 100 over which a call associated therewith is to be conducted.

The wireless electronic devices 100 may also be capable of receiving messages from the network 110 over the respective control channels 122a. In various embodiments according to the inventive concepts, the wireless electronic devices 100 receive Short Message Service (SMS), Enhanced Message Service (EMS), Multimedia Message Service (MMS), and/or Smartmessaging™ formatted messages.

The GPS satellite 174 can provide GPS information to the geographic region including cells 101, 102 so that the wireless electronic devices 100 may determine location information. The network 110 may also provide network location information as the basis for the location information applied by the wireless electronic devices 100. In addition, the location information may be provided directly to the server 135 rather than to the wireless electronic devices 100 and then to the server 135. Additionally or alternatively, the wireless electronic devices 100 may communicate with the local wireless network 170.

Figure 2A:
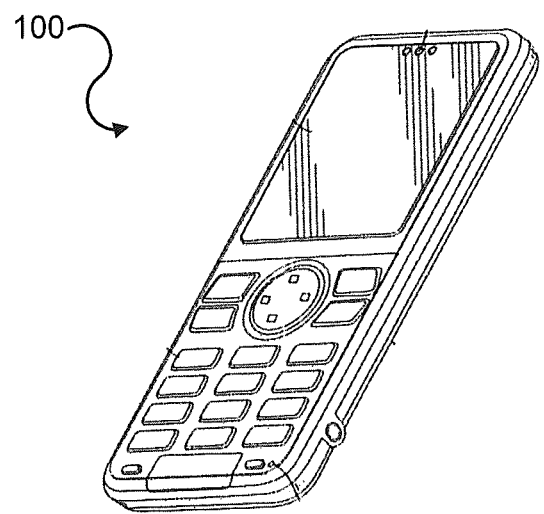
FIGS. 2A and 2B illustrate front and rear views, respectively, of a wireless electronic device, according to various embodiments of the present inventive concepts.
Figure 2B:
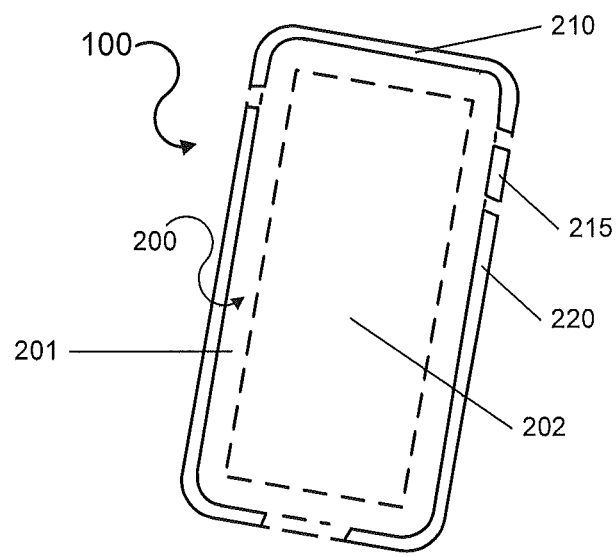

FIGS. 2A and 2B illustrate front and rear views, respectively, of a wireless electronic device 100, according to various embodiments of the present inventive concepts. Accordingly, FIGS. 2A and 2B illustrate opposite sides of the wireless electronic device 100. In particular, FIG. 2B illustrates an external face 201 of a backplate 200 of the wireless electronic device 100. Accordingly, the external face 201 of the backplate 200 may be visible to, and/or in contact with, a user of the wireless electronic device 100. In contrast, an internal face of the backplate 200 may face internal portions of the wireless electronic device 100, such as a transceiver circuit. In some embodiments, the backplate 200 may be a metal backplate.

FIG. 2B further illustrates a first antenna 210 and a second antenna 220 around a ground plane 202 of the wireless electronic device 100. The ground plane 202 may be between the backplate 200 and a front external face (e.g., a display) of the wireless electronic device 100. A planar user input component 215 may separate (e.g., may be physically between and may electrically isolate) the first and second antennas 210, 220. Moreover, the planar user input component 215 and the first and second antennas 210, 220 may collectively form a metal perimeter around the ground plane 202.

When touched by a user of the wireless electronic device 100, the planar user input component 215 may provide the functionality of a power, volume, or camera button, among other user input buttons/components. In contrast with a conventional, protruding user input component, however, the entire outer (e.g., external) surface of the planar user input component 215 may be planar (e.g., flat/smooth) and may be coplanar with the outer surfaces of adjacent portions of the metal perimeter around the wireless electronic device 100. For example, the outer surface of the planar user input component 215 may be touched by a user of the wireless electronic device 100 and may be coplanar with an outer surface of an adjacent portion of the first antenna 210 and/or an outer surface of an adjacent portion of the second antenna 220.

It will be understood that the wireless electronic device 100 may include more than one planar user input component. Moreover, it will be understood that the wireless electronic device 100 may include more than two antennas and/or that the antennas 210, 220 may include various types of antennas configured for wireless communications. For example, at least one of the antennas 210, 220 may be a monopole antenna or a planar inverted-F antenna (PIFA), among others. Additionally, at least one of the antennas 210, 220 may be a multi-band antenna and/or may be configured to communicate cellular and/or non-cellular frequencies.

In some embodiments, the backplate 200 of the wireless electronic device 100 may overlap/cover at least a portion of the antennas 210, 220. In other words, at least a portion of the antennas 210, 220 may be recessed within a perimeter of the external face 201 of the backplate 200, and may be between the external face 201 of the backplate 200 and a front external face (e.g., a display) of the wireless electronic device 100. Accordingly, although portions of the antennas 210, 220 may be outside the perimeter of the external face 201 of the backplate 200 (e.g., as illustrated in the rear view of the wireless electronic device 100 provided in FIG. 2B), the antennas 210, 220 may alternatively not be visible at all in the rear view of FIG. 2B or may be partially concealed by the external face 201 of the backplate 200.

Figure 3:
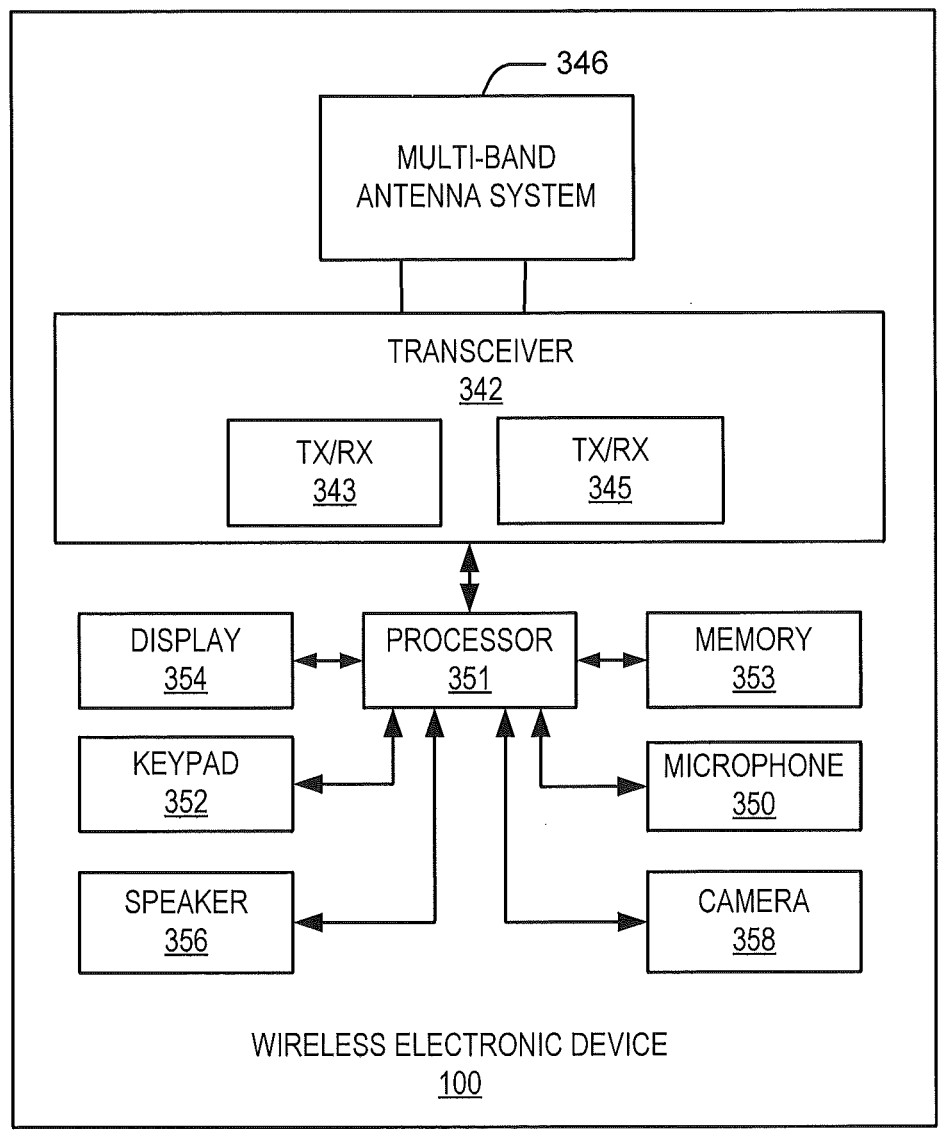
FIG. 3 is a block diagram illustrating a wireless electronic device, according to various embodiments of the present inventive concepts.

Referring now to FIG. 3, a block diagram is provided illustrating a wireless electronic device 100, according to various embodiments of the present inventive concepts. As illustrated in FIG. 3, a wireless electronic device 100 may include a multi-band antenna system 346, a transceiver 342, and a processor 351. The wireless electronic device 100 may further include a display 354, keypad 352, speaker 356, memory 353, microphone 350, and/or camera 358.

A transmitter portion of the transceiver 342 converts information, which is to be transmitted by the wireless electronic device 100, into electromagnetic signals suitable for radio communications (e.g., to the network 110 illustrated in FIG. 1). A receiver portion of the transceiver 342 demodulates electromagnetic signals, which are received by the wireless electronic device 100 from the network 110 to provide the information contained in the signals in a format understandable to a user of the wireless electronic device 100. The transceiver 342 may include transmit/receive circuitry (TX/RX) that provides separate communication paths for supplying/receiving RF signals to different radiating elements of the multi-band antenna system 346 via their respective RF feeds. Accordingly, when the multi-band antenna system 346 includes two active antenna elements (e.g., the antennas 210, 220), the transceiver 342 may include two transmit/receive circuits 343, 345 connected to different ones of the antenna elements via the respective RF feeds.

The transceiver 342, in operational cooperation with the processor 351, may be configured to communicate according to at least one radio access technology in two or more frequency ranges. The at least one radio access technology may include, but is not limited to, WLAN (e.g., 802.11), WiMAX (Worldwide Interoperability for Microwave Access), TransferJet, 3GPP LTE (3rd Generation Partnership Project Long Term Evolution), 4G, Time Division LTE (TD LTE), Universal Mobile Telecommunications System (UMTS), Global Standard for Mobile (GSM) communication, General Packet Radio Service (GPRS), enhanced data rates for GSM evolution (EDGE), DCS, PDC, PCS, Code Division Multiple Access (CDMA), wideband-CDMA, and/or CDMA2000. The radio access technology may operate using such frequency bands as 700-800 Megahertz (MHz), 824-894 MHz, 880-960 MHz, 1710-1880 MHz, 1820-1990 MHz, 1920-2170 MHz, 2300-2400 MHz, and 2500-2700 MHz. Other radio access technologies and/or frequency bands can also be used in embodiments according to the inventive concepts. Various embodiments may provide coverage for non-cellular frequency bands such as Global Positioning System (GPS), WLAN, and/or Bluetooth frequency bands. As an example, in various embodiments according to the inventive concepts, the local wireless network 170 (illustrated in FIG. 1) is a WLAN compliant network. In various other embodiments according to the inventive concepts, the local wireless network 170 is a Bluetooth compliant interface.

The wireless electronic device 100 is not limited to any particular combination/arrangement of the keypad 352 and the display 354. As an example, it will be understood that the functions of the keypad 352 and the display 354 can be provided by a touch screen through which the user can view information, such as computer displayable documents, provide input thereto, and otherwise control the wireless electronic device 100. Additionally or alternatively, the wireless electronic device 100 may include a separate keypad 352 and display 354. Moreover, it will be understood that the first and second antennas 210, 220 may substantially provide the sides/edges of the wireless electronic device 100 between the backplate 200 and the display 354.

Referring still to FIG. 3, the memory 353 can store computer program instructions that, when executed by the processor circuit 351, carry out the operations (e.g., speaker 356 volume operations, camera 358 operations, etc.) described herein and shown in the figures. As an example, the memory 353 can be non-volatile memory, such as EEPROM (flash memory), that retains the stored data while power is removed from the memory 353.

Figure 4A:
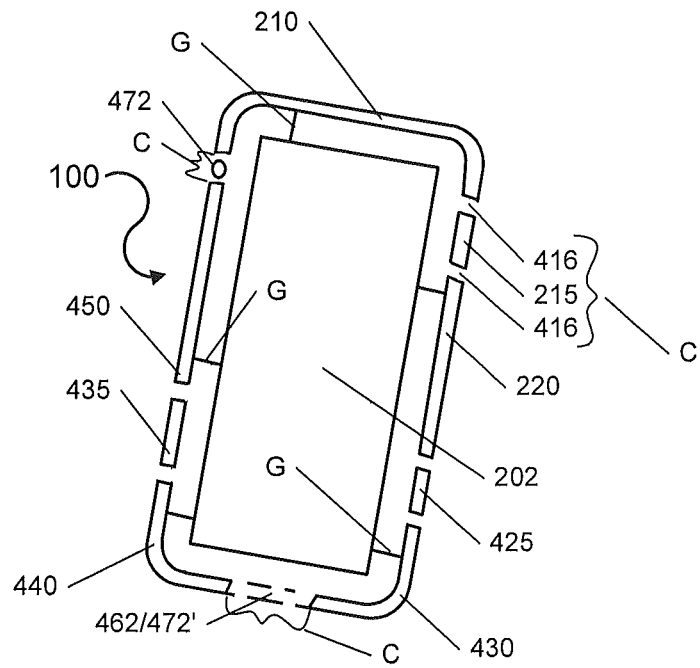
FIGS. 4A and 4B illustrate detailed views of a metal perimeter of a wireless electronic device, according to various embodiments of the present inventive concepts.
Figure 4B:
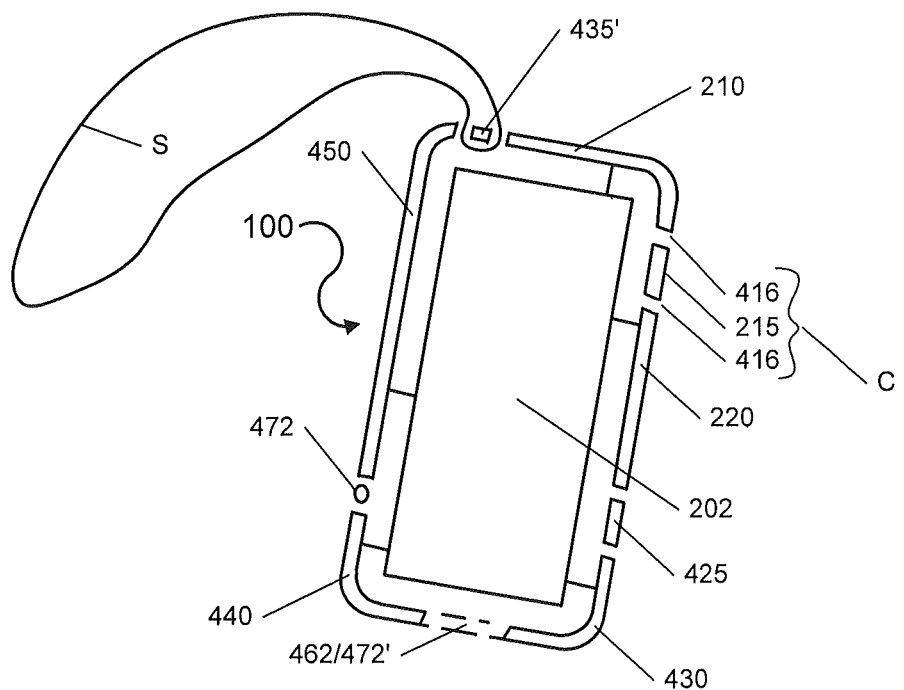

Referring now to FIGS. 4A and 4B, detailed views of a metal perimeter of a wireless electronic device 100 are illustrated, according to various embodiments of the present inventive concepts. For example, FIG. 4A illustrates the ground plane 202 connected to the first and second antennas 210, 220, which, along with the planar user input component 215, form the metal perimeter. The metal perimeter of the wireless electronic device 100 may further include third and fourth antennas 430, 440 connected to the ground plane 202 via ground connections G. The ground plane 202 may be on a printed circuit board, which may include various components of the wireless electronic device 100, such as the transceiver 342, the processor, 351, and/or the memory 353.

It will be understood that more or fewer than the four antennas 210, 220, 430, and 440 may be included in the metal perimeter of the wireless electronic device 100. Moreover, the metal perimeter may include a decorrelation component 450 (e.g., a decorrelation antenna) that is physically connected to the ground plane 202 and is configured to electrically divide the ground plane 202 into two portions to improve the performance of the antennas 210, 220, 430, and 440.

One or more of the antennas 210, 220, 430, and 440 may be connected to a transceiver circuit (e.g., the transceiver 342 illustrated in FIG. 3). Moreover, any of the antennas 210, 220, 430, and 440 may be a cellular antenna, a non-cellular antenna, or a diversity antenna. For example, the first antenna 210 may be a main cellular antenna operating at frequency bands of about 1.7 Gigahertz (GHz) or higher. The second antenna 220, on the other hand, may be a main cellular antenna operating at frequency bands below about 1.0 GHz. As an example, the second antenna 220 may use the ground plane 202 and/or the backplate 200 (e.g., a metal backplate) as a radiator. The third antenna 430 may be a non-cellular antenna that is configured for applications such as Global Positioning System (GPS), Wireless Local Area Network (WLAN) (e.g., 802.11), and/or Bluetooth. The fourth antenna 440 may be a diversity antenna (e.g., a diversity cellular antenna). It will be understood, however, that the third antenna 430 may alternatively be a cellular antenna, and that one of the first and second antennas 210, 220 may be a non-cellular antenna.

Referring still to FIG. 4A, the planar user input component 215 may be one among a plurality of planar input components of the wireless electronic device 100. For example, the metal perimeter of the wireless electronic device 100 may further include planar user input components 425, 435. The planar user input components 215, 425, and 435 may operate different functions of the wireless electronic device 100 when touched by a user. For example, one of the planar user input components 215, 425, and 435 may provide the functions of a power button that turns on/off the display 354 (illustrated in FIG. 3) and/or other components of the wireless electronic device 100. In particular, a user's touch input at one of the planar user input components 215, 425, and 435 may generate a user input signal that is provided to the processor 351 (illustrated in FIG. 3) to control the display 354.

A different one of the planar user input components 215, 425, and 435 may provide the functions of a volume button of the wireless electronic device 100. As an example, the volume functions may include increasing a volume level of the speaker 356 (illustrated in FIG. 3) of the wireless electronic device 100, decreasing the volume level of the speaker 356, muting/unmuting the speaker 356 (which may include muting/unmuting a telephone ringer), and/or activating/deactivating a vibration mode. It will be understood that the different volume functions may be performed by touching different portions (e.g., topmost and bottommost portions) of an outer surface of the same user input component or by touching different ones of the planar user input components 215, 425, and 435. Moreover, it will be understood that a volume function of the wireless electronic device 100 may be controlled by the processor 351 in response to a user input signal generated by one of the planar user input components 215, 425, and 435 as a result of a user touch input.

In some embodiments, one of the planar user input components 215, 425, and 435 may provide the functions of a camera button, such as taking a photo using the camera 358 (illustrated in FIG. 3), among other camera functions. The camera functions of the wireless electronic device 100 may be controlled by the processor 351 in response to a user input signal generated by one of the planar user input components 215, 425, and 435 as a result of a user touch input.

Moreover, it will be understood that the planar user input components 215, 425, and 435 may be incapable of mechanical movement. In other words the planar user input components 215, 425, and 435 may not be physical buttons that can be pressed to provide functionality. Rather, the planar user input components 215, 425, and 435 may be mechanically immobile and may include a touch, tap, and/or proximity sensor. For example, the planar user input components 215, 425, and 435 may include a mechanically-immobile capacitive touch sensor. Furthermore, although three planar user input components 215, 425, and 435 are illustrated in FIG. 4A, it will be understood that more or fewer touch planar user input components may be included in the metal perimeter around the ground plane 202. In other words, a combination of touch and mechanically-moveable user input components/buttons, all of which are planar, may form the metal perimeter. For example, in some embodiments, although volume and/or camera functions may be provided via mechanically-immobile planar user input components, the wireless electronic device 100 may include a mechanically-moveable power button that a user can press to provide power functions.

Each of the planar user input components 215, 425, and 435 may include a metal outer surface that is coplanar with metal outer surfaces of adjacent portions (e.g., antenna portions, etc.) of the metal perimeter. Accordingly, the planar user input components 215, 425, and 435 may improve the continuity of the wireless electronic device 100's metal look and feel along the perimeter. In some embodiments, each of the planar user input components 215, 425, and 435 may include an outer surface with the same metal as an outer surface of each of the antennas 210, 220, 430, and 440.

FIG. 4A further illustrates that the metal perimeter of the wireless electronic device 100 may have cuts C (e.g., discontinuities/openings/breaks) to provide space for connectors such as audio/video connectors 472/472' and/or power connectors 462. Audio/video connectors 472/472' may include a headphone port/jack 472, Universal Serial Bus (USB) port 472', and/or a high definition audio/video port 472' (e.g., High-Definition Multimedia Interface (HDMI) or Mobile High-Definition Link (MHL)), among others. In some embodiments, a power connector 462 may additionally include audio/video connector functionality, such as in the example of a USB port. Moreover, it will be understood that a cut C in the metal perimeter of the wireless electronic device 100 may further include a void and/or a dielectric/insulative/insulator material 416 to electrically isolate the audio/video connector 472/472' and/or the power connector 462 therein from adjacent portions of the metal perimeter. The dielectric/insulative/insulator material 416 may include plastic, glass, and/or ceramic. Additionally, it will be understood that the planar user input components 215, 425, and 435 may include a void and/or the dielectric/insulative/insulator material 416 to provide electrical isolation from adjacent portions (e.g., antenna portions) of the metal perimeter.

According to some embodiments, the metal perimeter of the wireless electronic device 100 may be a continuously metal perimeter except for the cuts C that provide openings for the audio/video connectors 472/472', the power connector 462, and the planar user input components 215, 425, and 435. In other words, in contrast with cuts/insulators that provide electrical isolation between antennas without providing additional functionality, each discontinuity in the metal perimeter described herein may correspond to an input/output component/connector of the wireless electronic device 100. The cuts C in the metal perimeter may thus blend in with the inputs/outputs (or other functional connector components, such as strap holders) therein, which may help the wireless electronic device 100 to better appear as if it has a continuous metal perimeter around it.

Referring to FIG. 4B, the metal perimeter of the wireless electronic device 100 may include a physical attachment connector 435'. The physical attachment connector 435' may be, for example, a strap holder for a strap S that a user can hold and/or attach to another object. The physical attachment connector 435' may additionally or alternatively secure/receive a protective case/cover for the wireless electronic device 100. The physical attachment connector 435' may include a metal outer surface that is coplanar with outer surfaces of adjacent portions, respectively, of the metal perimeter. Alternatively, an outer surface of the physical attachment connector 435' may be recessed with respect to outer surfaces of the metal perimeter and/or may be non-metal. Moreover, the physical attachment connector 435' may include a void and/or the dielectric/insulative/insulator material 416 to provide electrical isolation from adjacent portions (e.g., antenna portions) of the metal perimeter. Furthermore, additionally or alternatively to the physical attachment connector 435', the metal perimeter of the wireless electronic device 100 may include a cut C for the speaker 356 and/or a cut C for the microphone 350 of FIG. 3.

Referring now to FIG. 5, coplanar elements of a metal perimeter of a wireless electronic device 100 are illustrated, according to various embodiments of the present inventive concepts. Although only a few coplanar elements are emphasized in FIG. 5, it will be understood that an outer surface of any portion of the metal perimeter of the wireless electronic device 100 described herein (e.g., as illustrated in FIGS. 2B, 4A, and/or 4B) may be coplanar with an outer surface of an adjacent portion of the metal perimeter. Additionally, it will be understood that elements of the metal perimeter of the wireless electronic device 100 may be arranged at various different locations along/in the metal perimeter. For example, the first antenna 210 may include portions along a top end of the wireless electronic device 100 and along a side/edge of the wireless electronic device 100. Alternatively, the first antenna 210 may include portions along a bottom end of the wireless electronic device 100 or only along a top end or side/edge of the wireless electronic device 100. Accordingly, if the first antenna 210 includes a portion along a curved corner of the metal perimeter of the wireless electronic device 100, then the first antenna 210 may include a curved (i.e., non-planar) portion as well as planar portions extending from respective ends of the curved portion. If, on the other hand, the first antenna 210 is confined only to one of a top end, bottom end, or side/edge, then the entire outer surface of the first antenna 210 may be planar.

FIG. 5 emphasizes that an outer surface of the planar user input component 215 extending in the x-direction is coplanar with an outer surface of an adjacent portion of the first antenna 210 and with an outer surface of an adjacent portion of the second antenna 220. As another example, FIG. 5 emphasizes that an outer surface of the planar user input component 425 extending in the y-direction is coplanar with outer surfaces of the respective adjacent portions of the metal perimeter. In particular, the outer surface of the planar user input component 425 is coplanar with an outer surface of a portion of the second antenna 22Q and with an outer surface of a portion of the third antenna 430. Additionally, the planar user input component 215 is much wider in the x-direction than a conventional wireless electronic device cut/insulator. Similarly, the planar user input component 425 is much wider in the y-direction than a conventional wireless electronic device cut/insulator. The coplanar elements of the metal perimeter of the wireless electronic device 100 described herein therefore may reduce short-circuits between adjacent antennas and may provide a smoother, more continuous look to the exterior of the wireless electronic device 100.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A wireless electronic device, comprising:
    a ground plane; and
    a metal perimeter around the ground plane, the metal perimeter comprising a metal planar user input component comprising a metal outer surface that is coplanar with an outer surface of a first adjacent portion of the metal perimeter,
    wherein the metal planar user input component is at a break of the metal perimeter that separates the first adjacent portion from a second adjacent portion of the metal perimeter,
    wherein the metal outer surface of the metal planar user input component is entirely planar,
    wherein the metal perimeter further comprises first and second antennas,
    wherein the metal planar user input component separates the first and second antennas,
    wherein the metal planar user input component comprises a mechanically-immobile touch sensor comprising the metal outer surface that is coplanar with the outer surface of the first adjacent portion of the metal perimeter,
    wherein the mechanically-immobile touch sensor, comprising the metal outer surface that is coplanar with the outer surface of the first adjacent portion of the metal perimeter, comprises a rectangular shape comprising a width sufficient to inhibit short-circuits between the first and second antennas, and
    wherein the outer surface of the first adjacent portion of the metal perimeter comprises a portion of one of the first and second antennas.

2. The wireless electronic device of claim 1, wherein the metal planar user input component comprises a camera user input component, a volume user input component, or a power user input component.

3. The wireless electronic device of claim 1, wherein the first and second antennas and the metal outer surface of the mechanically-immobile touch sensor comprise a same metal.

4. The wireless electronic device of claim 3, wherein:
    the mechanically-immobile touch sensor comprises a first metal planar user input component;
    the metal perimeter further comprises a second metal planar user input component;
    the first and second metal planar user input components are configured to operate different respective functions; and
    a metal outer surface of the second metal planar user input component is coplanar with an outer surface of a portion of the metal perimeter that is adjacent the second metal planar user input component.

5. The wireless electronic device of claim 4, further comprising:
    a processor;
    a camera; and
    a speaker,
    wherein the first metal planar user input component is configured to provide a first user input signal to the processor to control a volume function of the speaker, and
    wherein the second metal planar user input component is configured to provide a second user input signal to the processor to control the camera.

6. The wireless electronic device of claim 3, further comprising:
    an audio/video connector; and
    a power connector,
    wherein the mechanically-immobile touch sensor comprises one metal planar user input component among a plurality of metal planar user input components along the metal perimeter,
    wherein the first and second antennas comprise first and second antennas among a plurality of antennas along the metal perimeter,
    wherein the metal perimeter comprises a continuous metal perimeter except for respective discontinuities in the metal perimeter corresponding to the audio/video connector, the power connector, and the plurality of metal planar user input components, and
    wherein the discontinuities provide respective disconnections of the metal perimeter.

7. The wireless electronic device of claim 6, wherein:
    each of the discontinuities comprises an opening comprising an insulator and a respective one of the audio/video connector, the power connector, or one of the plurality of metal planar user input components; and
    the metal perimeter further comprises a discontinuity corresponding to a strap holder.

8. The wireless electronic device of claim 1, further comprising a multi-band transceiver circuit coupled to the first and second antennas and configured to provide communications for the wireless electronic device via a plurality of frequency bands.

9. The wireless electronic device of claim 8, wherein:
the metal perimeter further comprises a third antenna;
the first and second antennas comprise respective cellular antennas; and
the third antenna comprises a non-cellular antenna or a diversity antenna.

10. The wireless electronic device of claim 8, further comprising a metal backplate on the multi-band transceiver circuit.

11. A wireless electronic device, comprising:
a multi-band transceiver circuit configured to provide communications for the wireless electronic device via a plurality of frequency bands; and
a metal perimeter around the multi-band transceiver circuit, the metal perimeter comprising:
first and second antennas; and
a metal planar user input component comprising a metal outer surface that is coplanar with an outer surface of an adjacent portion of the metal perimeter,
wherein the metal planar user input component separates the first and second antennas,
wherein the metal planar user input component comprises a mechanically-immobile sensor comprising the metal outer surface that is coplanar with the outer surface of the adjacent portion of the metal perimeter,
wherein the mechanically-immobile sensor is configured to receive a user input from a user of the wireless electronic device, and
wherein the mechanically-immobile sensor, comprising the metal outer surface that is coplanar with the outer surface of the adjacent portion of the metal perimeter, comprises a rectangular shape comprising a width sufficient to inhibit short-circuits between the first and second antennas.

12. The wireless electronic device of claim 11, wherein:
the metal planar user input component comprises one metal planar user input component among a plurality of metal planar user input components along the metal perimeter;
the metal perimeter further comprises a plurality of connector components;
the plurality of metal planar user input components and the plurality of connector components correspond to respective discontinuities in the metal perimeter; and
the metal perimeter comprises a continuous metal perimeter except for the discontinuities.

13. The wireless electronic device of claim 12, wherein the plurality of connector components comprise one or more audio/video connectors, one or more power connectors, and/or one or more physical attachment connectors.

14. The wireless electronic device of claim 11, further comprising:
a processor;
a camera;
a speaker; and
a display screen defining a front external face of the wireless electronic device,
wherein the mechanically-immobile sensor is on a side of the wireless electronic device that is non-coplanar with the front external face that is defined by the display screen, and
wherein the mechanically-immobile sensor is configured to provide a user input signal to the processor to power on/off the display screen, to control a volume function of the speaker, or to control the camera, responsive to the user input.

\* \* \* \* \*